(12) United States Patent
Porat et al.

(10) Patent No.: US 10,663,048 B2
(45) Date of Patent: May 26, 2020

(54) TILT TRAY MECHANISM

(71) Applicant: GBI, Intralogistics Solutions, Deerfield Beach, FL (US)

(72) Inventors: Joseph Porat, Highland Beach, FL (US); Israel Schechter, Aventura, FL (US)

( * ) Notice: Subject to any disclaimer, the term of this patent is extended or adjusted under 35 U.S.C. 154(b) by 26 days.

(21) Appl. No.: 16/056,668

(22) Filed: Aug. 7, 2018

(65) Prior Publication Data

US 2020/0049244 A1 Feb. 13, 2020

(51) Int. Cl.
| | | |
|---|---|---|
| *F16H 37/12* | (2006.01) | |
| *B65G 47/96* | (2006.01) | |
| *F16H 25/18* | (2006.01) | |
| *F16H 21/44* | (2006.01) | |

(52) U.S. Cl.
CPC .............. *F16H 37/12* (2013.01); *B65G 47/96* (2013.01); *F16H 21/44* (2013.01); *F16H 25/18* (2013.01)

(58) Field of Classification Search
CPC .......... F16H 37/12; F16H 21/44; F16H 25/18; B65G 47/96
See application file for complete search history.

(56) References Cited

U.S. PATENT DOCUMENTS

| | | | | |
|---|---|---|---|---|
| 3,463,298 | A | * | 8/1969 | Harrison .............. B65G 47/965 198/370.04 |
| 3,662,874 | A | * | 5/1972 | Muller ................. B65G 47/962 198/370.04 |
| 3,974,909 | A | | 8/1976 | Johnson |
| 4,004,681 | A | | 1/1977 | Clewett et al. |
| 4,139,088 | A | * | 2/1979 | Olesen ................. B65G 47/962 198/370.04 |
| 5,857,555 | A | | 1/1999 | Maier et al. |
| 6,009,992 | A | * | 1/2000 | Erceg ................... B65G 47/962 198/370.04 |
| 6,082,522 | A | | 7/2000 | Polling |
| 6,193,074 | B1 | * | 2/2001 | Baum .................. B65G 47/962 198/370.04 |
| 6,247,576 | B1 | * | 6/2001 | Bonnet ................ B65G 47/965 198/370.04 |
| 6,874,614 | B2 | | 4/2005 | Heitplatz |
| 8,851,267 | B2 | * | 10/2014 | Sotelo .................... B65G 17/12 198/370.04 |

(Continued)

*Primary Examiner* — David M Fenstermacher
(74) *Attorney, Agent, or Firm* — Glenn E. Gold, P.A.; Glenn E. Gold (57) ABSTRACT

A mechanical linkage system is provided to facilitate controlled tilting of a tray mounted on a carrier in a product sortation system. A pair of rotatable tilt plates are disposed between a pair of base plates and support the tray. A rotatable pivot bar is disposed between the base plates. A pair of linkage mechanisms are configured to tilt the tray in opposite directions. Each linkage mechanism includes a link pivotally connected at one end to the pivot bar, a pivot arm, and a cam follower. The pivot arm has a pivot joint connected to another end of the link, a cam joint where the cam follower is located, and a rotary joint where the pivot arm is rotatably connected to one of the base plates. The cam follower is situated in a track formed in one of the tilt plates. During operation, a pivoting of the pivot bar is transformed by the linkage mechanism into a rotation of the tilt plate, which is induced by the cam follower traveling through the track as the pivot arm rotates.

20 Claims, 9 Drawing Sheets

(56) References Cited

U.S. PATENT DOCUMENTS

| | | | |
|---|---|---|---|
| 9,481,529 B2 * | 11/2016 | Berdelle-Hilge | B65G 47/962 |
| 9,676,566 B2 * | 6/2017 | Porat | B65G 47/962 |
| 9,796,538 B2 * | 10/2017 | Heitplatz | B65G 17/22 |
| 10,000,346 B2 * | 6/2018 | Berdelle-Hilge | B65G 47/965 |
| 10,160,606 B2 * | 12/2018 | Erceg | B65G 47/96 |
| 10,494,193 B2 * | 12/2019 | Sorensen | B65G 47/945 |

\* cited by examiner

TILT TRAY MECHANISM

FIELD OF THE INVENTION

The present invention relates to product distribution and sortation systems, and, more particularly, to a tilt tray mechanism for use with carriage trays.

BACKGROUND OF THE INVENTION

Now more than ever, it's extremely important how fast and efficiently a business can sort, package and ship packages to their consumers. The speed in which a business is able to deliver a product to their consumer is linked to the overall success of the business. For instance, if it takes a business longer to sort, package and ship a package to a consumer than it takes their competitor to the do same, the consumer will almost always prefer to do business with their competitor. Loyalty to a particular brand company is no longer what sways consumers when making purchases, instead it whittles down to how fast the business can produce a result. Accordingly, over the past two decades large companies, such as Amazon® and Walmart® have invested millions of dollars on systems that enhance and expedite their sorting, packaging and distribution process so that their consumers receive their products as quickly as possible.

In the simplest of arrangements, a typical sortation system used by a company to sort their merchandise usually includes a mechanical carrier device attached to a tray that runs on a track through a distribution network. During the sorting process individual parcels are loaded onto trays attached to the carriers that are transported through the sorting systems distribution network to a discharge location. When a carrier transporting a parcel arrives at its discharge location, the tray on which the parcel is disposed on tilts and discharges the parcel onto a receptacle prepping the package ready for shipment. However, issues arise when packages or parcels transported on the carrier and tray are too heavy (e.g. exceed over 5 pounds). Parcels that are too heavy for the tray and carrier, if not perfectly centered on the tray, will sometimes cause the tray to unexpectedly tilt and erroneously discharge the parcel before it arrives at its designated discharge location. The erroneous discharge of a parcel may cause a system error that will either slow down or completely shut down the sorting process until the error is corrected. As a result, to avoid such a problem, which would ultimately affect the productivity of the business, packages sorted and distributed by these systems are limited by their weight (i.e. they do not typically exceed over 5 pounds). Meaning, businesses have to find alternative solutions on how to sort and distribute packages exceeding their systems limitation (e.g., by implementing additional sorting equipment to handle packages/parcels that are too heavy for their preexisting system).

Accordingly, there is a long-felt but, as-of-yet, unmet need for an improved sorting carrier and tilt tray system particularly suited for sorting and distributing heavy packages, and that overcomes the limitations of conventional sorting carrier and tray systems.

SUMMARY OF THE INVENTION

The present invention is directed to an innovation that overcomes the deficiencies of the prior art and the problems that remain unsolved by providing a tray assembly that can accommodate oversized parcels.

Accordingly, in one aspect of the present invention, an assembly for use with a tilt tray comprises:
a frame;
a pair of first and second opposing, spaced-apart tilt plates rotatably connected to the frame to define a common axis of rotation, each tilt plate having a track formed therein, a reference plane passing through the common axis of rotation and having a first side and a second side;
wherein the first and second tilt plates operatively support the tilt tray;
a pivot member rotatably connected to the frame, the pivot member having an upper end and a lower end;
a first mechanism associated with the first tilt plate, the first mechanism comprising:
  a first link having a first end and a second end, the first link pivotally connected at the first end thereof to the pivot member at the upper end thereof,
  a first pivot arm having a pivot joint, a cam joint, and a rotary joint located on the first side of the reference plane and defining an axis of rotation,
  wherein the first pivot arm is rotatably connected at the rotary joint thereof to the frame, and the first pivot arm is pivotally connected at the pivot joint thereof to the first link at the second end thereof, and
  a first cam follower disposed at the cam joint of the first pivot arm, the first cam follower movable within the track of the first tilt plate during operable rotation of the first pivot arm in a first direction to induce a rotary displacement of the first tilt plate; and
a second mechanism associated with the second tilt plate, the second mechanism comprising:
  a second link having a first end and a second end, the second link pivotally connected at the first end thereof to the pivot member at the upper end thereof,
  a second pivot arm having a pivot joint, a cam joint, and a rotary joint located on the second side of the reference plane and defining an axis of rotation,
  wherein the second pivot arm is rotatably connected at the rotary joint thereof to the frame, and the second pivot arm is pivotally connected at the pivot joint thereof to the second link at the second end thereof, and
  a second cam follower disposed at the cam joint of the second pivot arm, the second cam follower movable within the track of the second tilt plate during operable rotation of the second pivot arm in a second direction opposite the first direction to induce a rotary displacement of the second tilt plate.

In another aspect of the invention, as assembly for use with a tilt tray comprises:
a frame having a pair of first and second opposing, spaced-apart base plates;
a pair of first and second opposing, spaced-apart tilt plates disposed intermediate the pair of base plates and rotatably connected to the frame at the pair of base plates to define a common axis of rotation, each tilt plate having a track formed therein, a reference plane passing through the common axis of rotation and having a first side and a second side;
wherein the first and second tilt plates operatively support the tilt tray;
a pivot member rotatably connected to the frame at the pair of first and second base plates, the pivot member having an upper end and a lower end;
a first mechanism associated with the first tilt plate, the first mechanism comprising:

a first link having a first end and a second end, the first link pivotally connected at the first end thereof to the pivot member at the upper end thereof, a first pivot arm having a pivot joint, a cam joint, and a rotary joint located on the first side of the reference plane and defining an axis of rotation, wherein the first pivot arm is rotatably connected at the rotary joint thereof to the first base plate, and the first pivot arm is pivotally connected at the pivot joint thereof to the first link at the second end thereof, and a first cam follower disposed at the cam joint of the first pivot arm, the first cam follower movable within the track of the first tilt plate during operable rotation of the first pivot arm in a first direction to induce a rotary displacement of the first tilt plate; and a second mechanism associated with the second tilt plate, the second mechanism comprising:

a second link having a first end and a second end, the second link pivotally connected at the first end thereof to the pivot member at the upper end thereof, a second pivot arm having a pivot joint, a cam joint, and a rotary joint located on the second side of the reference plane and defining an axis of rotation, wherein the second pivot arm is rotatably connected at the rotary joint thereof to the second base plate, and the second pivot arm is pivotally connected at the pivot joint thereof to the second link at the second end thereof, and a second cam follower disposed at the cam joint of the second pivot arm, the second cam follower movable within the track of the second tilt plate during operable rotation of the second pivot arm in a second direction opposite the first direction to induce a rotary displacement of the second tilt plate.

In another aspect of the invention, an assembly for use with a tilt tray comprises:

a frame having a pair of first and second opposing, spaced-apart base plates;

a rotary shaft configured to connect the pair of base plates;

a pair of first and second opposing, spaced-apart tilt plates rotatably supported by the rotary shaft to define a common axis of rotation, each tilt plate having a track formed therein, a generally vertical reference plane passing through the common axis of rotation and having a first side and a second side;

wherein the first and second tilt plates operatively support the tilt tray;

a connection member configured to connect the pair of tilt plates to enable tandem rotation thereof;

a pivot member rotatably connected to the frame at the pair of first and second base plates, the pivot member having an upper end and a lower end;

a detent mechanism configured to releasably maintain the pivot member in a centered orientation;

a first mechanism associated with the first tilt plate, the first mechanism comprising:

a first link having a first end and a second end, the first link pivotally connected at the first end thereof to the pivot member at the upper end thereof, a first pivot arm having a pivot joint, a cam joint, and a rotary joint located on the first side of the vertical reference plane and defining an axis of rotation, wherein the first pivot arm is rotatably connected at the rotary joint thereof to the first base plate, and the first pivot arm is pivotally connected at the pivot joint thereof to the first link at the second end thereof, and a first cam follower disposed at the cam joint of the first pivot arm, the first cam follower movable within the track of the first tilt plate during operable rotation of the first pivot arm in a first direction to induce a rotary displacement of the first tilt plate; and a second mechanism associated with the second tilt plate, the second mechanism comprising:

a second link having a first end and a second end, the second link pivotally connected at the first end thereof to the pivot member at the upper end thereof, a second pivot arm having a pivot joint, a cam joint, and a rotary joint located on the second side of the vertical reference plane and defining an axis of rotation, wherein the second pivot arm is rotatably connected at the rotary joint thereof to the second base plate, and the second pivot arm is pivotally connected at the pivot joint thereof to the second link at the second end thereof, and a second cam follower disposed at the cam joint of the second pivot arm, the second cam follower movable within the track of the second tilt plate during operable rotation of the second pivot arm in a second direction opposite the first direction to induce a rotary displacement of the second tilt plate.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
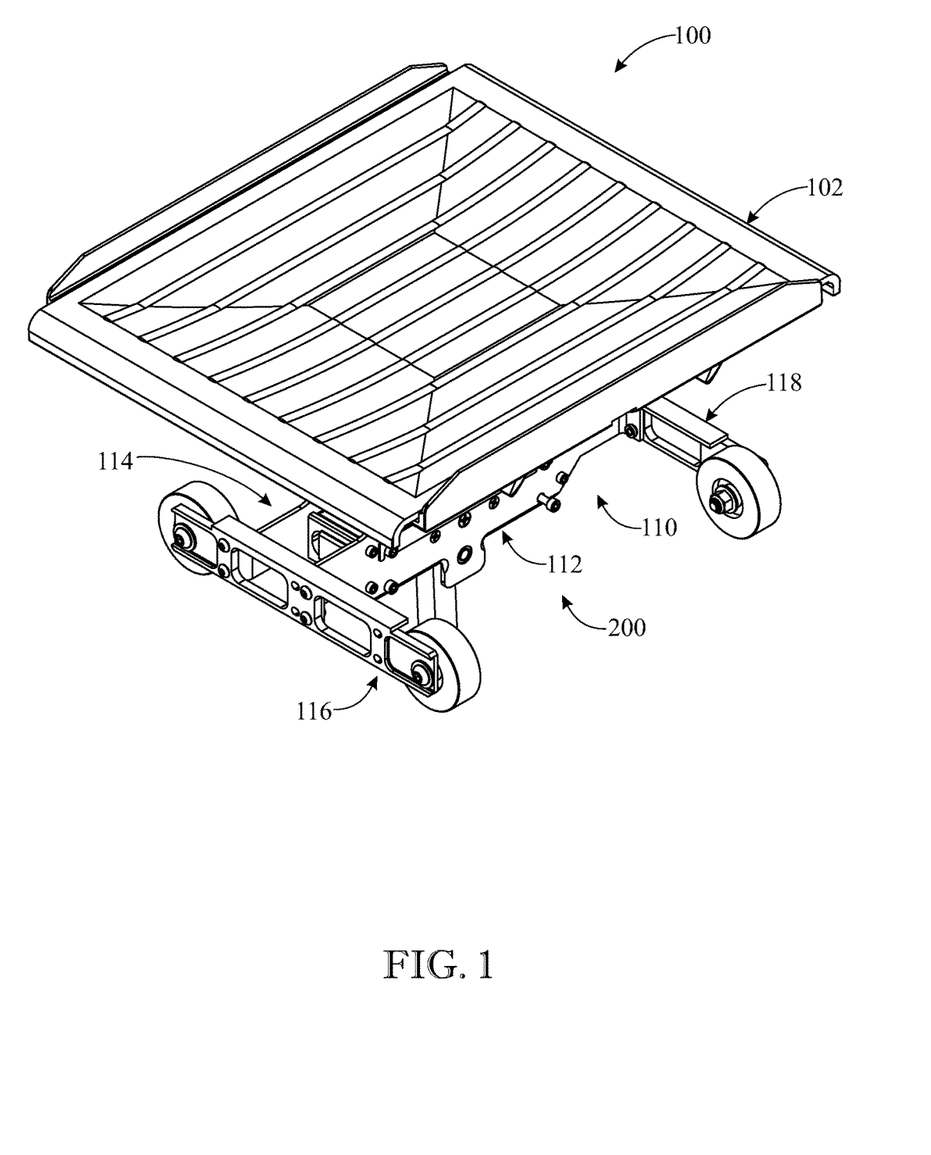
FIG. 1 presents an isometric upper perspective view of a tray assembly for use with a carriage in a product sortation system, in accordance with aspects of the present invention.
Figure 2:
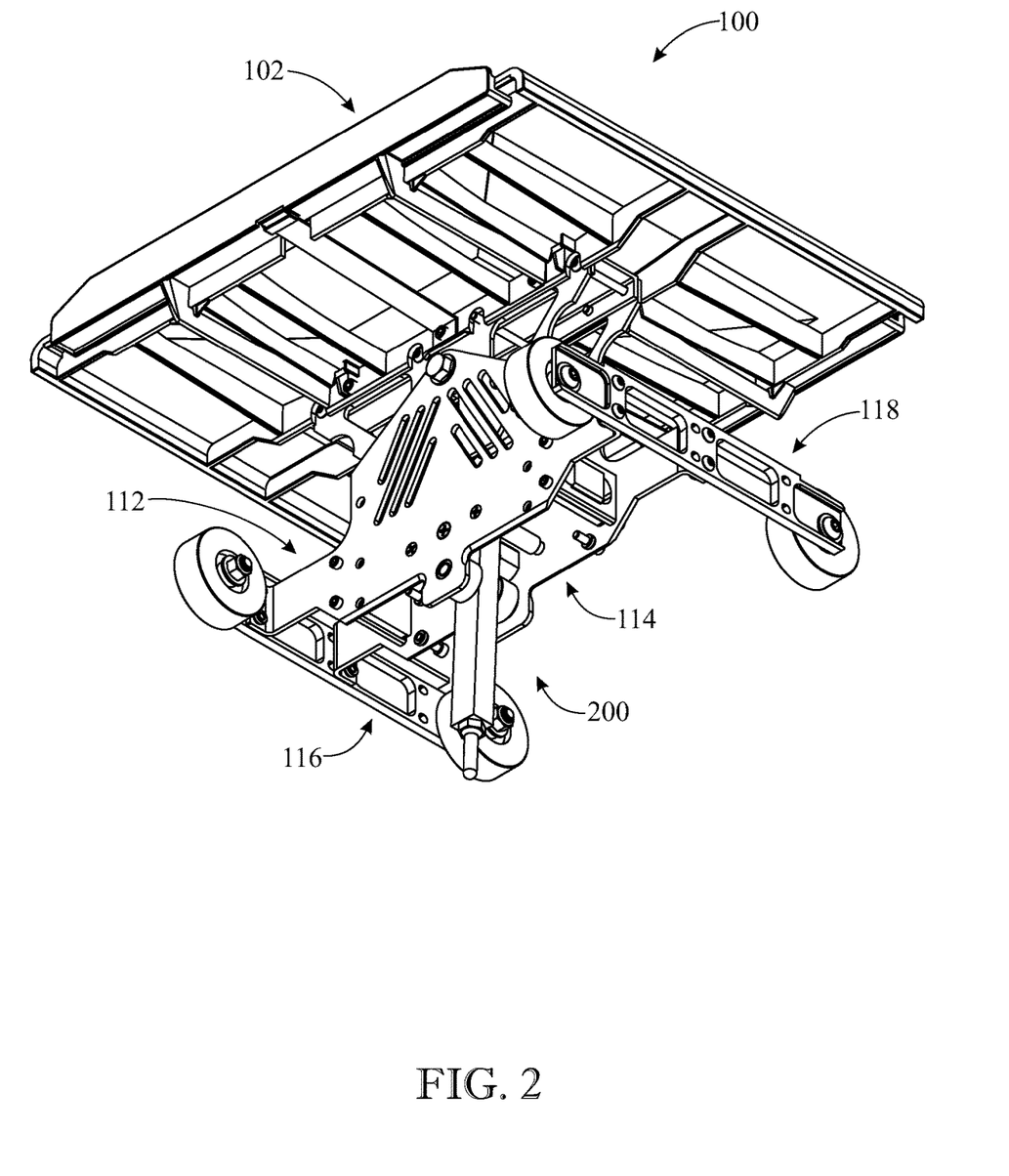
FIG. 2 presents an isometric lower elevation view of the tray assembly originally introduced in FIG. 1, showing an underside of the tray to illustrate the arrangement of parts, as installed, that are configured to support and tilt the tray.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-4, there is illustrated an exemplary embodiment of a tray assembly, generally designated 100, which includes a tilt system, generally designated 200, for tilting a tray 102 in accordance with aspects of the present invention. The tray assembly 100 can be integrated with a carriage device for use in a product sortation and distribution system, such as that disclosed in U.S. Pat. No. 9,676,566, which is hereby incorporated-by-reference herein its entirety. The tray assembly 100 would receive an article meant for sorting and distribution, such as a package, product, parcel, or article of manufacture. Furthermore, the tray assembly 100 is assembled and otherwise configured to sort and distribute packages, products, parcels, or any other form of articles up to about 35 pounds.

The tray 102 serves as a platform or receiving area for an article loaded onto tray assembly 100. The tray assembly 100 includes a frame, generally designated 110, having a pair of opposing, spaced-apart base plates 112, 114. The frame 110 facilitates support of tray platform 102 at its underside. The base plates 112, 114 have a generally planar construction. Each base plate 112, 114 have a respective pair of opposite sides 120, 122 connected to a main body 124.

The tray assembly 100 further includes a pair of double-wheeled rail members 116, 118 each connected to the base plates 112, 114 at respective sides. In particular, rail member 116 is connected to base plates 112, 114 at sides 120 thereof, while rail member 118 is connected to base plates 112, 114 at sides 122 thereof. In this configuration, the double-wheeled rail members 116, 118 are disposed in parallel, spaced-apart relationship at an underside of tray assembly 100 to form the contact points between tray assembly 100 and a conveyance system. The combination of frame 110 (base plates 112, 114) and the attached pair of double-wheeled rail members 116, 118 provides a cart configuration for tray assembly 100 that facilitates connection to an underlying carrier for installation in a product sortation system, where, for example, the tray assembly 100 can be rolled along tracks via the double-wheeled rail members 116, 118.

Figure 3:
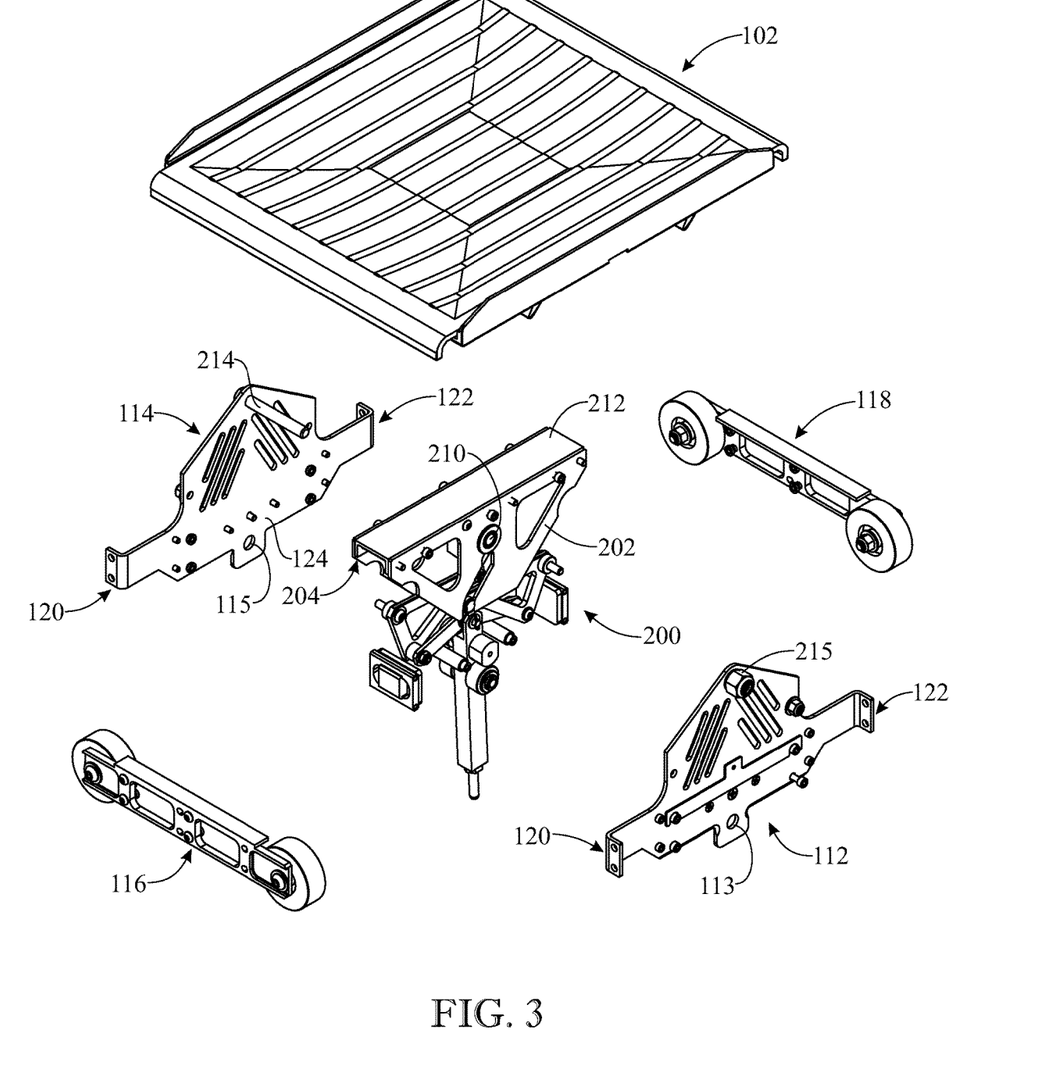
FIG. 3 presents an exploded isometric upper elevation view of the tray assembly as originally depicted in FIG. 1, illustrating the various units of the integrated assembly.
Figure 4:
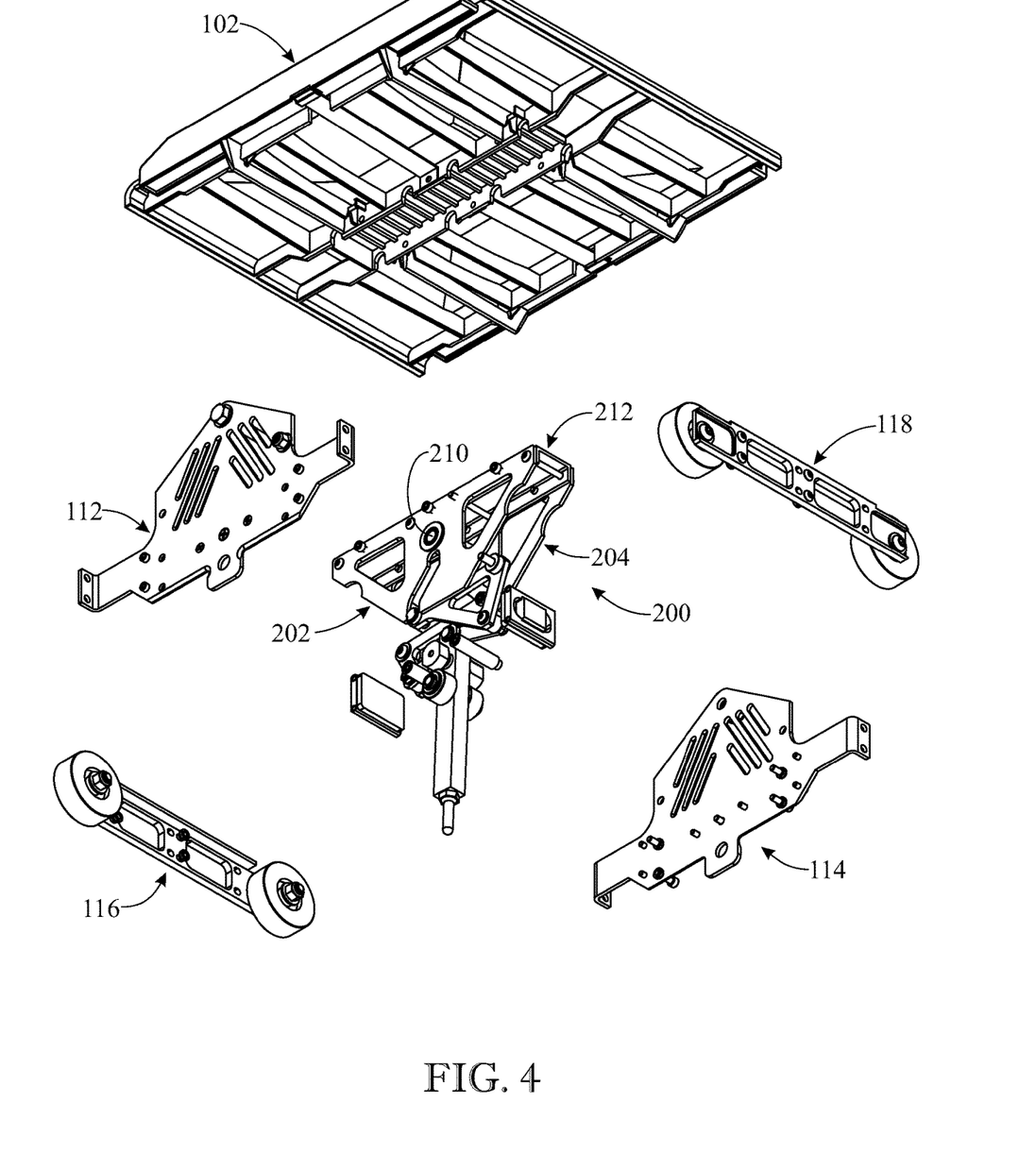
FIG. 4 presents an exploded isometric lower elevation view of the tray assembly as originally depicted in FIG. 1 and further illustrated in FIG. 2.

Referring now to FIGS. 5-9, with continuing reference to FIGS. 3 and 4, the tilt system 200 includes a pair of opposing, spaced-apart tilt plates 202, 204 that are rotatable relative to the pair of base plates 112, 114 about a common axis of rotation. In one form, this axis of rotation can be defined by a rotary shaft 214 (FIG. 3) that extends between and connects the pair of base plates 112, 114 at their upper ends. The rotary shaft 214 may be fastened using any conventional means, such as a nut 215. The tilt plates 202, 204 have a generally planar construction. Each one of the tilt plates 202, 204 is rotatably disposed about, and supported by, the rotary shaft 214. In this manner, the tilt plates 202, 204 are rotatably connected to the base plates 112, 114. By way of illustration, an appropriate hole is formed in tilt plate 202 to define a pivot point 210. A similar pivot point (not shown) is formed in tilt plate 204. The rotary shaft 214 is simultaneously received through both pivot points 210 of the tilt plates 202, 204. In this installed configuration, tilt plate 202 is proximal base plate 112 and tilt plate 204 is proximal base plate 114. Tilt plate 202 can pivot or rotate relative to proximal base plate 112 about pivot point 210. A similar rotary relationship exists between tilt plate 204 and proximal base plate 114.

In their installed condition, the tilt plates 202, 204 are disposed in facing opposition to one another between the pair of base plates 112, 114. In one form, the tilt plates 202, 204 are arranged so that they can move in tandem. For this purpose, a connecting member 212 (FIGS. 3, 4) is fixedly secured to each of the tilt plates 202, 204 at their upper ends, thereby coupling the tilt plates 202, 204 to one another. In this manner, the tilt plates 202, 204 pivot in unison, even in operating situations where only one of the tilt plates 202, 204 experiences a rotary driving action. A pair of support brackets (not shown) may be attached to the tilt plates 202, 204 at their upper ends in order to provide a support or bearing surface to receive tray 102. The tray 102 is supported by the pair of tilt plates 202, 204. Accordingly, any pivoting motion from either one of the tilt plates 202, 204 will cause a corresponding tilt or pivot of tray 102.

The tilt system 200 further includes a pivot member 220 including a pivot bar 222 and a pivot rod 224. The pivot bar 222 has a generally elongate construction and is rotatably connected to the pair of base plates 112, 114 at their lower ends. For this purpose, a rotary shaft (not shown) extends between and connects the pair of base plates 112, 114 at their lower ends where respective shaft-receiving apertures 113, 115 are located. The pivot bar 222 is rotatably disposed about, and supported by, this rotary shaft to define a pivot point 226 that establishes an axis of rotation for pivot bar 222. In this position, pivot bar 222 is disposed intermediate the pair of base plates 112, 114. The axis of rotation defined by pivot point 210 (i.e., which pertains to relative rotation between the pair of tilt plates 202, 204 and the pair of base plates 112, 114) and the axis of rotation defined by pivot point 226 (i.e., which pertains to relative rotation between pivot bar 222 and the pair of base plates 112, 114) are substantially parallel to one another. In one form, the axis of rotation defined by pivot point 210 and the axis of rotation defined by pivot point 226 define a substantially vertical plane passing through them, which has a first side and a second side. In one form, this vertical plane includes a center line that is perpendicular both to the axis of rotation defined by pivot point 210 and the axis of rotation defined by pivot point 226. In particular, the pivot bar 222 has an axis of rotation (at pivot point 226) that is spaced-apart from the common axis of rotation of the pair of tilt plates 202, 204 to define a dimensional direction therebetween that constitutes a center line of tilt system 200.

The pivot bar 222 has an upper end 230 and a lower end 232. The pivot rod 224 extends longitudinally from pivot bar 222 at its lower end 232. The pivot bar 222 and pivot rod 224 are rigidly connected to one another. A detent mechanism, generally illustrated at 280, is integrated with pivot bar 222 in order to stably locate and maintain pivot bar 222 in the over-center position illustrated in FIG. 5. This over-center position is characterized by a vertical orientation of pivot bar 222 in which its longitudinal dimension is collinear with a center line passing through the axis of rotation of pivot bar 222 and the common axis of rotation of the tilt plates 202, 204. The detent mechanism 280 is configured to releasably resist displacement of pivot bar 222 from its at-rest centered position. In one form, the detent mechanism 280 includes, in combination, a detent receiver disposed at the upper end 230 of the pivot bar 222, a complementary ball detent mateable with the detent receiver, and a spring plunger configured to spring load bias the ball detent into mating engagement with the detent receiver. The detent mechanism 280 temporarily holds the pivot bar 222 in the over-center position and is designed to prevent vibration or other slight side forces from moving pivot bar 222. It also prevents unwanted movement of the pivot bar 222 if a heavy unbalanced package is placed on the tray 102. This temporary locking action provided by detent mechanism 280 is releasable when a sufficient force is applied to pivot bar 222. Such a force would occur during an operating mode when a force is administered to pivot bar 222 to deliberately cause pivoting of pivot bar 222 and thereby initiate the actuation (activation) of the appropriate linkage mechanism 230, 232 in order to tilt tray 102.

The tilt system 200 further includes a pair of linkage mechanisms 230, 232 each associated with a respective one of the tilt plates 202, 204 and a respective one of the base plates 112, 114. In particular, the first linkage mechanism 230 is associated with tilt plate 202 and base plate 112, while the second linkage mechanism 232 is associated with tilt plate 204 and base plate 114. The first linkage mechanism 230 includes a link 240, a pivot arm 242, and a cam follower 244. The link 240 includes a first end 250 and a second end 252. The pivot arm 242 includes a pivot joint 254, a cam joint 256, and a rotary joint 258. The link 240 is pivotally connected at its first end 250 to pivot bar 222 at its upper end 230. In this manner, rotation of pivot bar 222 produces a movement of link 240. The pivot arm 242 is rotatably connected at its rotary joint 258 to base plate 112. The pivot arm 242 is pivotally connected at its pivot joint 254 to link 240 at its second end 252. In this manner, movement of link 240 effectuates a rotation of pivot arm 242 about the axis of rotation defined by the rotary joint 258.

The cam follower 244, in one configuration, is provided in the form of a roller-type bearing device disposed at the cam joint 256 of pivot arm 242. For purposes of utilizing cam follower 244, a complementary passage or track 260 is formed in tilt plate 202 to receive and guide cam follower 244. The track 260 has an inner side 262 proximal to the rotary joint 258 and an outer side 264 distal to the rotary joint 258. As pivot arm 242 rotates (i.e., in the exemplary clockwise direction for the configuration shown), the cam follower 244 moves within track 260. During this guided movement of cam follower 244 within track 260, the cam follower 244 bears upon the outer side 264 of track 260, which induces a rotary displacement of tilt plate 202 about its axis of rotation 210 and consequently causes a tilt of tray 102 supported by the pair of tilt plates 202, 204. The complementary design of track 260 relative to cam follower 244 has several features. The track 260 is suitably sized to receive cam follower 244. Additionally, in one form, the contour of track 260 traces out an arc that is coextensive, in part, with the circumference of a circle having a center at the rotary joint 258 and a radius corresponding to the distance between rotary joint 258 and cam joint 256.

In one form, the pivot arm 242 has a multi-section configuration. A first section 270 extends between the rotary joint 258 and cam joint 256. A second section 272 extends between the rotary joint 258 and pivot joint 254. A third section 274 extends between the pivot joint 254 and cam joint 256. In one form, the three sections 270, 272, 274 interconnect to define a triangular configuration where the vertices define the cam joint 256, rotary joint 258, and the pivot joint 254. The first pivot arm 242 features a non-collinear relationship among its rotary joint 258, pivot joint 254, and cam joint 256.

Figure 5:
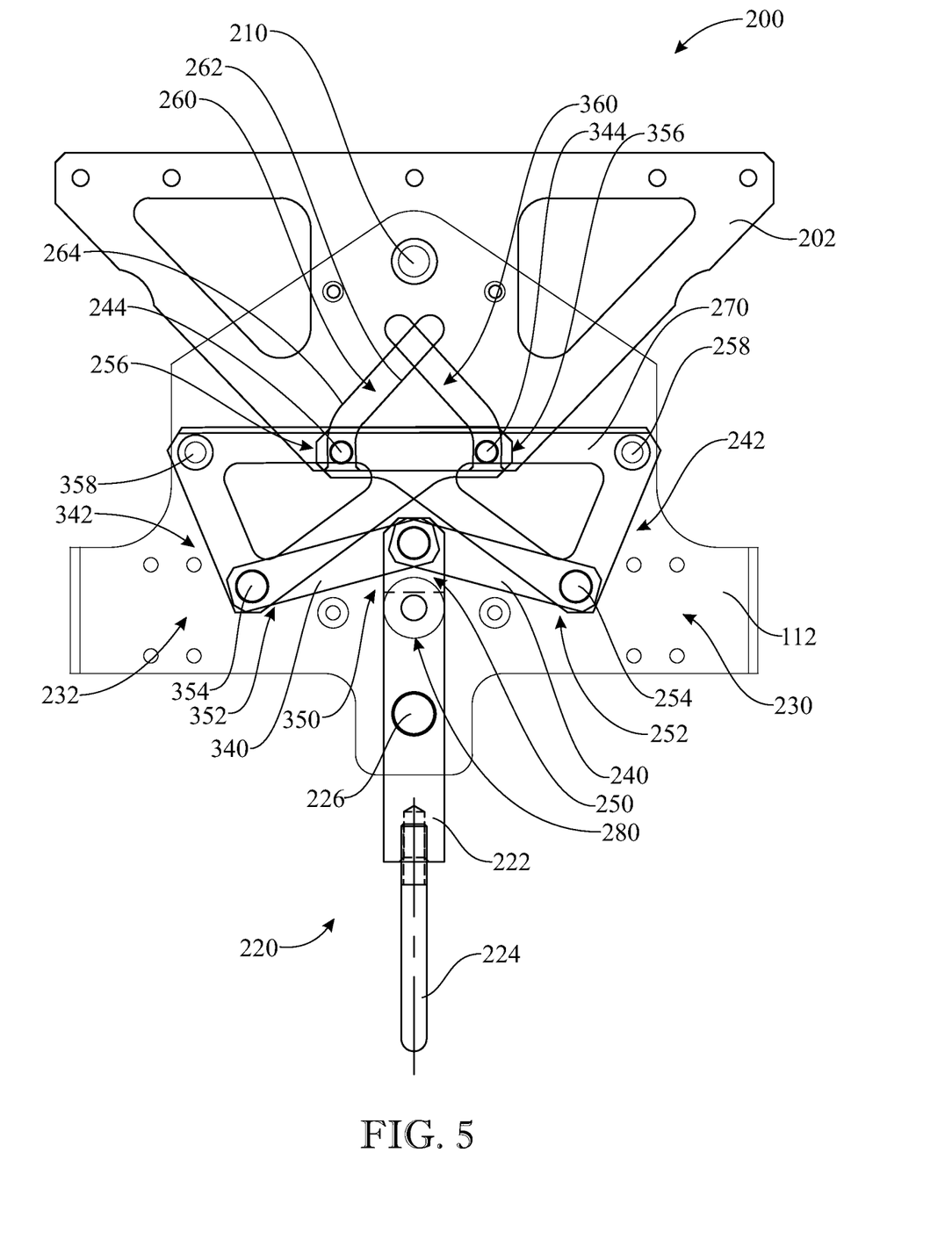
FIG. 5 presents a planar sectional view of the tray assembly originally introduced in FIG. 1, depicting the tilt system shown in FIGS. 3 and 4 and illustrating a pair of spaced-apart tilt mechanisms, shown in phantom view, located at opposite sides of the tilt system, and further depicting the configuration of both tilt mechanisms while the tray is in a non-tilt state coincident with a non-pivoting state of the pivot bar.
Figure 6:
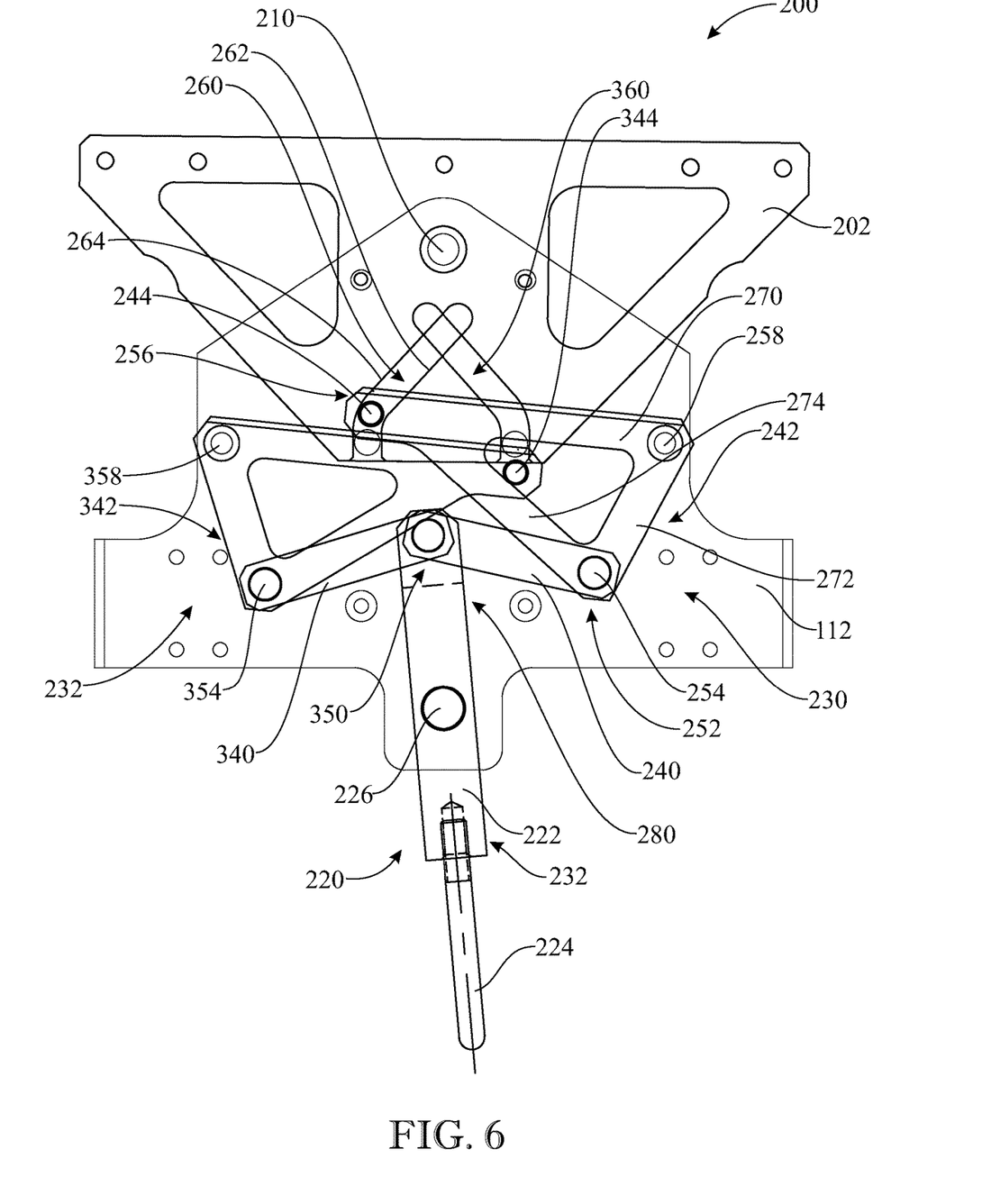
FIG. 6 presents a planar view of the pair of tilt mechanisms originally depicted in FIG. 5, illustrating the onset of deployment of both tilt mechanisms in response to an incipient pivoting of the pivot bar, and further illustrating the accompanying tilting of the tray that results from a driving action of the relevant tilt mechanism involving guided travel of a cam follower.
Figure 7:
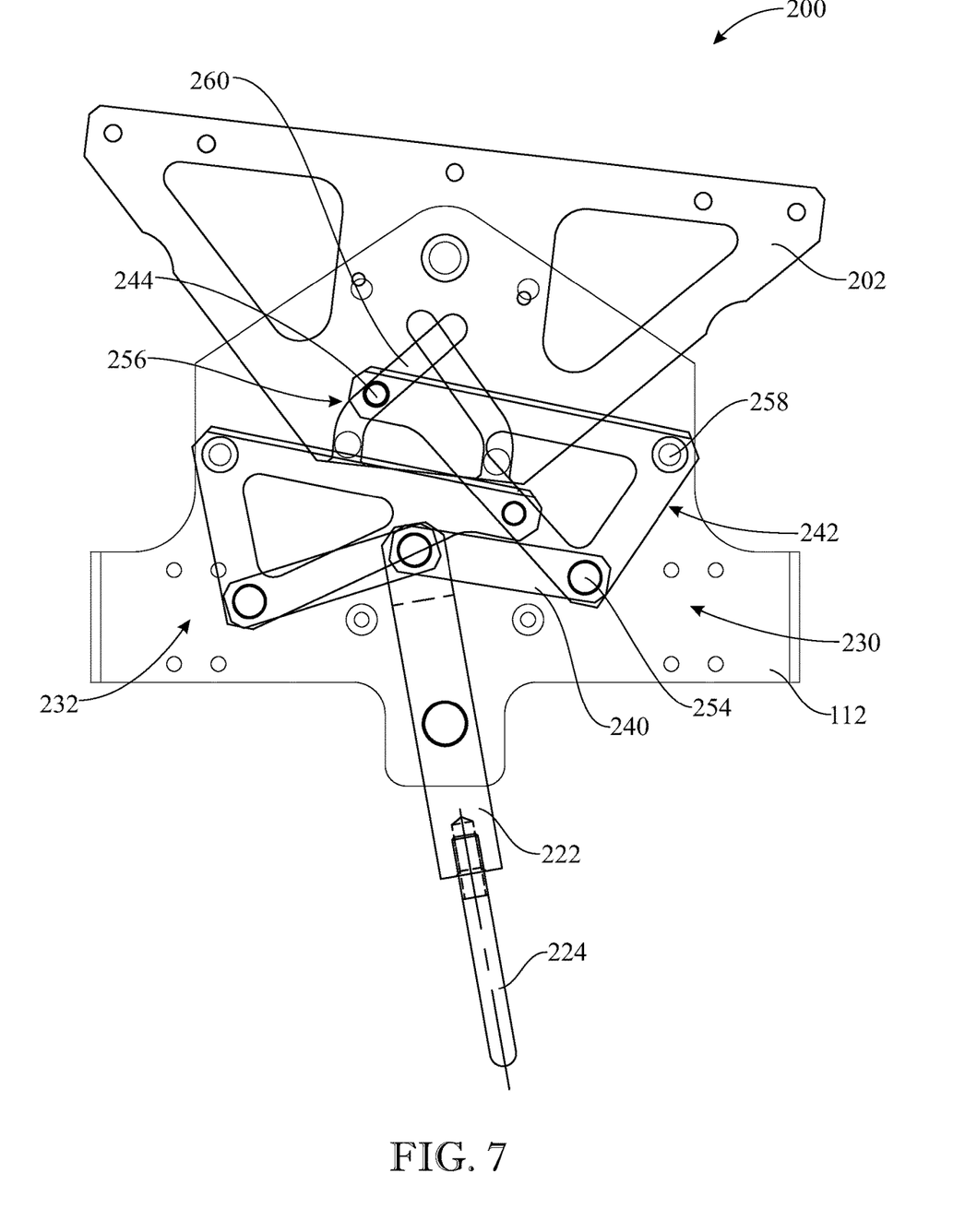
FIG. 7 presents a planar view of the pair of tilt mechanisms originally depicted in FIG. 5, and further shown in FIG. 6, illustrating a further sequential progression in the deployment of both tilt mechanisms and the tilting of the tray in response to continued pivoting of the pivot bar relative to that shown in FIG. 6 and accompanying advancement of the cam follower in its course of travel.
Figure 8:
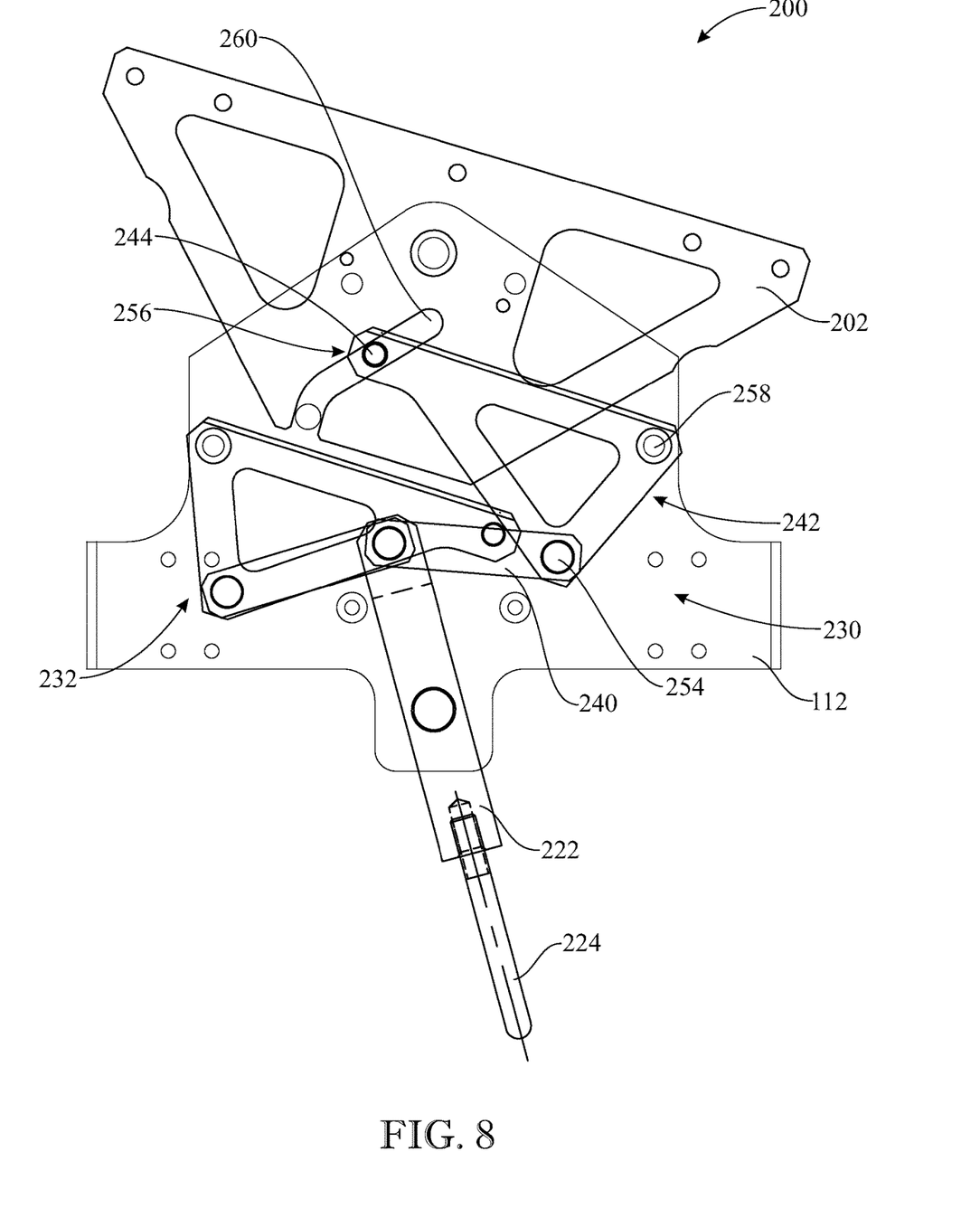
FIG. 8 presents a planar view of the pair of tilt mechanisms originally depicted in FIG. 5, and further shown in FIGS. 6 and 7 in progressive states of operation, illustrating a further development of the tilting activity of the tray from that shown in FIG. 7.

The tilt system 200 further includes second linkage mechanism 232 associated with tilt plate 204 and base plate 114. The first linkage mechanism 230 and second linkage mechanism 232 have the same construction, functionality, and cooperative interconnection of components. As best shown in FIG. 5, first linkage mechanism 230 and second linkage mechanism 232 are arranged as mirror-image duplicates of one another across a vertical plane passing through the common axis of rotation of the tilt plates 202, 204 (defined through pivot point 210 of tilt plate 202) and the axis of rotation of the pivot bar 222 (at pivot point 226). From another perspective, tilt system 200 features bi-lateral symmetry across this vertical plane in terms of how the first linkage mechanism 230 and second linkage mechanism 232 are configured. Due to their mirror-image configurations, the first linkage mechanism 230 and second linkage mechanism 232 will produce opposite rotations of their respective tilt plates 202, 204 depending on the direction of rotation of pivot bar 222. For example, by way of illustration in reference to FIGS. 6-9, first linkage mechanism 230 is activated as pivot bar 222 rotates in the counter-clockwise direction, actuating a clockwise rotation of its associated tilt plate 202. Similarly, but in an opposite manner, second linkage mechanism 232 is activated as pivot bar 222 rotates in the clockwise direction, actuating a counter-clockwise rotation of its associated tilt plate 204.

Referring to FIG. 5, the second linkage mechanism 232 includes a link 340, a pivot arm 342, and a cam follower 344. The link 340 includes a first end 350 and a second end 352. The pivot arm 342 includes a pivot joint 354, a cam joint 356, and a rotary joint 358. The link 340 is pivotally connected at its first end 350 to pivot bar 222 at its upper end 230. In this manner, rotation of pivot bar 222 produces a movement of link 340. The pivot arm 342 is rotatably connected at its rotary joint 358 to base plate 114. The pivot arm 342 is pivotally connected at its pivot joint 354 to link 340 at its second end 352. In this manner, movement of link 340 effectuates a rotation of pivot arm 342 about the axis of rotation defined by the rotary joint 358. The cam follower 344 is disposed at the cam joint 356 of pivot arm 342. For purposes of utilizing cam follower 344, a complementary passage or track 360 is formed in tilt plate 204 to receive and guide cam follower 344 during rotation of pivot arm 342.

The first linkage mechanism 230 and second linkage mechanism 232 are organized as mechanical linkages each having a topology suitable to communicate a pivoting rotation of pivot bar 222 into a pivoting rotation of a respective one of the tilt plates 202, 204, and thereby cause tray 102 to tilt. In such a topology, each of the components of first linkage mechanism 230 (link 240, pivot arm 242, cam follower 244, cam track 260) and second linkage mechanism 232 (link 340, pivot arm 342, cam follower 344, cam track 360) can be conceptualized as rigid bodies that collectively and cooperatively form a kinematic chain of action. Once deployed based on the direction of rotation of pivot bar 222, the components of the activated linkage mechanism 230, 232 act in a cooperative way to transform the rotation of pivot bar 222 into rotation of the affected tilt plate 202, 204.

Referring now to FIGS. 6-9, the operation of tray assembly 100, and specifically tilt system 200, will be discussed. By way of comparison, FIG. 5 illustrates the configuration of the pair of linkage mechanisms 230, 232 during a non-actuated state, which corresponds to the non-rotation of pivot bar 222. By way of illustration, FIGS. 6-9 depict the progression of events that ensue when a force is continuously applied to pivot rod 224 in a manner sufficient to rotate pivot bar 222 about its pivot point 226 in the counterclockwise direction.

The actuation of first linkage mechanism 230 commences with a force or other such activity applied to pivot rod 224, which cause the rigidly attached pivot bar 222 to rotate. As discussed further, the first linkage mechanism 230 transforms this rotary motion of pivot bar 222 into a rotary displacement of tilt plate 202 in the opposite direction (i.e., clockwise). This pivoted movement of tilt plate 202 effects a tilting displacement of tray 102, which is mounted upon and supported by the pair of tilt plates 202, 204.

As the pivot bar 222 begins to pivot about its pivot point 226 (FIG. 6), the components of first linkage mechanism 230 are deployed into action. In particular, the link 240 attached to pivot bar 222 follows the movement of pivot bar 222 as it is pulled or drawn along by the rotating pivot bar 222. The movement of link 240 creates a turning moment for pivot arm 242 about rotary joint 258. This turning moment develops based on the line of action of the force that extends along the longitudinal dimension of link 240 due to the pulling action exerted on link 240 by rotating pivot bar 222. The turning moment is also a function of the distance from the pivot axis of pivot arm 242 (at rotary joint 258) to the pivot joint 254 connecting the pivot arm 242 to the link 240.

Figure 9:
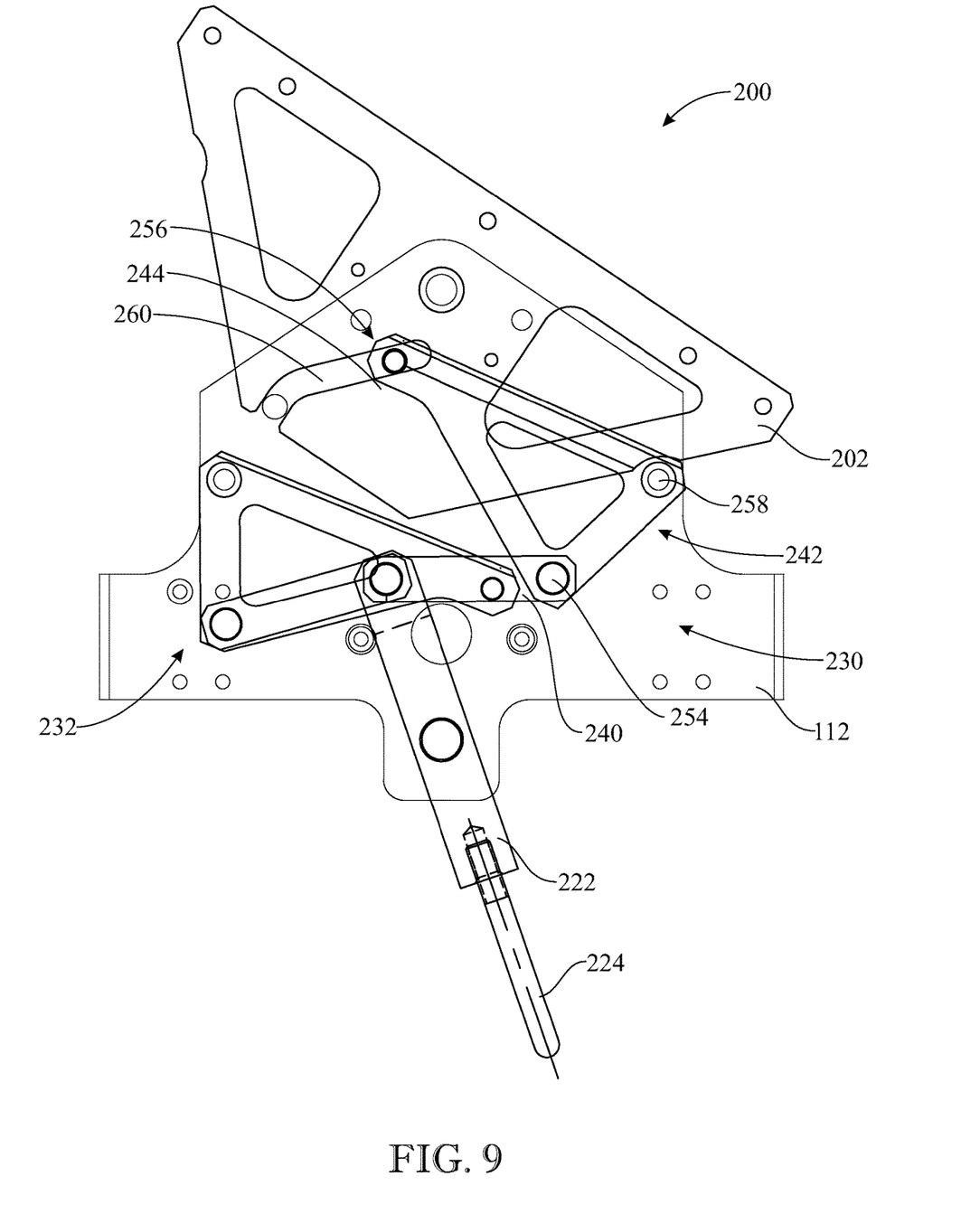
FIG. 9 presents a planar view of the pair of tilt mechanisms originally depicted in FIG. 5, and further shown in FIGS. 6, 7, and 8 in progressive states of operation, illustrating a further development of the tilting activity of the tray from that shown in FIG. 8.

As the rotation of pivot arm 242 proceeds, in response to the turning moment produced by link 240 exerting a turning influence on pivot arm 242 at pivot joint 254, the cam follower 244 (located at cam joint 256 of pivot arm 242) begins to travel in its course defined by the profile of track 260 formed in tilt plate 202. The cam follower 244, in the form of a roller bearing device, exerts a force applied to the outer bearing surface 264 of track 260 as the cam follower 244 travels in guided fashion through track 260 while pivot arm 242 rotates. The cam track 260 is suitably formed so that this guided movement of cam follower 244 through track 260 induces a rotational influence on tilt plate 202. For example, the track 260 is defined in tilt plate 202 to form a contour that is located beyond the vertical centerline passing through the pivot point 210 of tilt plate 202. In this manner, the action of cam follower 244 as it passes through track 260 is able to actuate a rotary displacement of tilt plate 202 about its axis of rotation at pivot point 210. The tilt plate 202 continues to rotate until the cam follower 244 reaches the full extent of its travel through track 260 (FIG. 9). Since the pair of tilt plates 202, 204 are connected together, both tilt plates 202, 204 move or rotate in tandem, even though only tilt plate 202 is actuated into rotation by its associated linkage mechanism 230 responsive to the pivoting of pivot bar 222. Because the tray 102 is mounted on the pair of tilt plates 202, 204, the illustrated rotation of tilt plate 202 will correspondingly tilt tray 102.

At the same time that first linkage mechanism 230 is deployed in response to the illustrated rotation of pivot bar 222, the second linkage mechanism 232 experiences a counterpart movement, although it does not communicate any rotary influence to its associated tilt plate 204. Referring again to FIGS. 5-9, the illustrated rotation of pivot bar 222 exerts a pushing motion on link 340 of second linkage mechanism 232 (which contrasts with the simultaneous pulling motion that pivot bar 222 exerts on link 240 of first linkage mechanism 230). The movement of link 340 as it follows the pivoting of pivot bar 222 creates a turning moment for pivot arm 342 in view of its attachment to link 340 at pivot joint 354. This turning moment induces a rotation of pivot arm 342 in a direction such that cam follower 344 (disposed at the cam joint 356 of pivot arm 342) departs from its original location in cam track 360 formed in tilt plate 204 and moves away from tilt plate 204. The pivot arm 342 continues to rotate away from tilt plate 204 (and track 360) as pivot bar 222 continues to pivot. As a result, for the illustrated direction of rotation depicted in FIGS. 6-9, the cam follower 344 never exerts any rotary influence on its associated tilt plate 204. Both tilt plates 202, 204 rotate in tandem, however, as first linkage mechanism 230 is deployed, since the tilt plates 202, 204 are connected together and move whenever one of the linkage mechanisms 230, 232 is deployed.

The initial configuration depicted in FIG. 5 is restored by returning pivot bar 222 to its centered position. During this restoration process, the components of linkage mechanism 230, 232 simply reverse their movements. This restoration takes places after the unloading activity is completed for tray assembly 100 and there is no longer a present need to maintain tray 102 in a tilted position. Any further tilting displacements of tray 102 can be ordered by managing the rotation of pivot bar 222 via its activating rod 224.

The illustrated tilt system 200 features the ability to selectively tilt tray 102 by controlling the pivoting of pivot bar 222. The tilt system 200 also offers other features in its design. FIG. 5 depicts the original location of both first linkage mechanism 230 and second linkage mechanism 232 prior to any deployment arising from the pivoting of pivot bar 222. Even in this initial, non-deployed state, the linkage mechanisms 230, 232 feature the capacity to manage any off-center loads impinging on tray 102. An off-center load is one that impinges on tray 102 with a vector that is non-collinear with the center line passing through the axis of rotation of pivot bar 222 and the common axis of rotation of tilt plates 202, 204. The first linkage mechanism 230 and its associated cam track 260 formed in tilt plate 202 are cooperatively configured such that a rotational influence exerted on tilt plate 202 (via a force applied to the overlying tray 102) induces an exertion on pivot arm 242 via cam follower 244 that is generally directed towards the axis of rotation of pivot arm 242 along a dimension extending between the cam joint 256 and rotary joint 258 of pivot arm 242. For these purposes, in the original configuration depicted in FIG. 5, the pivot arm 242 is oriented such that its section 270 extending between cam joint 256 and rotary joint 258 is generally perpendicular to the center line. Moreover, in this initial configuration state, cam follower 256 is located at an entranceway or vestibule of track 260.

The tilt system 200 is configured such that the force of any off-center loads on tray 102 tends to rotate the tilt plates 202, 204 about their common axis of rotation (i.e., pivot point 210 of tilt plate 202). For example, any rotational force on tray 102 administered to the left of the center line (FIG. 5) will produce a reaction by cam follower 244. The tilt plate 202, via the outer bearing surface 264 of cam track 260, will apply a force against cam follower 244 that originates from the tendency of tilt plate 202 to rotate due to the off-center load. In reaction, cam follower 244 communicates this force to the pivot arm 242 along a line of action that is directed towards the axis of rotation of pivot arm 242. In particular, the force exerted on pivot arm 242 (transmitted via cam follower 244), which arises from a tendency of tilt plate 202 to rotate due to application of an off-center load, is applied along the dimension extending between cam joint 256 and rotary joint 258 (i.e., along section 270 of pivot arm 242). Since the line of action of the force is directed towards its axis of rotation, pivot arm 242 does not experience any turning moment. Thus, when the linkage mechanisms 230, 232 are in the over-center position depicted in FIG. 5 (i.e., pivot bar 222 is non-displaced), the linkage mechanisms 230, 232 (via their pivot arms 242, 342) are able to resist the tendency of the tilt plates 202, 204 to want to rotate in response to off-center loads impacting the overlying tray 102.

The tilt system 200 offers additional advantages. It is simple to actuate and offers multiple degrees of freedom characterized by opposite tilting directions. The tilt system 200 is a modular unit that can be installed with each carrier, allowing each tray assembly 100 to possess the ability to have its tray 102 tilted. An advantageous feature of tilt system 200 is that each of the linkage mechanisms 230, 232 is non-motorized and requires no integrated power source to operate. Each linkage mechanism 230, 232 is powered only by the appropriate rotation of pivot bar 222. The topology of each linkage mechanism 230, 232 is configured so that this powering afforded by pivot bar 222 is alone sufficient to initiate and sustain the activity of the linkage mechanisms 230, 232 in terms of transforming the rotation of pivot bar 222 into a corresponding rotation of the appropriate tilt plate 202, 204. The cooperative relationship among the constituent components of linkage mechanisms 230, 232 (i.e., pin 240, pivot arm 242, cam follower 244, cam track 260 for linkage mechanism 230) is sufficient as an assembly to manage this transformation process without any powering support, apart from the pivoting action of pivot bar 222.

The activation of the tilt system 100 by pivoting of the pivot bar 222 may be accomplished by any suitable means known to those skilled in the art. For example, a controller (not shown) can be configured to selectively control the movement of pivot bar 222 via appropriate engagement and maneuvering of the attached pivot rod 224, which acts as a pilot device to guide the rotation of pivot bar 222 as pivot rod 224 is itself moved in one of the permissible rotary directions. Pushing the pivot rod 224 in one direction initiates deployment of one of the linkage mechanisms 230, 232, while pushing it in the opposite direction deploys the other linkage mechanism 230, 232. The management of pivot rod 224 can be coordinated with the package discharge schedule, so that tilting of tray 102 is undertaken once the carrier reaches its destination where the package is assigned for unloading. As described above, when a side force is applied to pivot rod 224 sufficient to move it, pivot bar 222 rotates, which deploys one of the linkage mechanisms 230, 232. In particular, for linkage mechanism 230, pivot arm 242 is induced to rotate as link 240 moves by following the pivoting action of pivot bar 222. The rotation of pivot arm 242 causes cam follower 244 to move through track 260 formed in tilt plate 202. The guided movement of cam follower 244 through its track 260 induces a rotation of tilt plate 202, thereby tilting tray 102.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. An assembly for use with a tilt tray, comprising:
a frame;
a pair of first and second opposing, spaced-apart tilt plates rotatably connected to the frame to define a common axis of rotation, each tilt plate having a track formed therein, a reference plane passing through the common axis of rotation and having a first side and a second side;
wherein the first and second tilt plates operatively support the tilt tray;
a pivot member rotatably connected to the frame, the pivot member having an upper end and a lower end;
a first mechanism associated with the first tilt plate, the first mechanism comprising:
a first link having a first end and a second end, the first link pivotally connected at the first end thereof to the pivot member at the upper end thereof,
a first pivot arm having a pivot joint, a cam joint, and a rotary joint located on the first side of the reference plane and defining an axis of rotation,
wherein the first pivot arm is rotatably connected at the rotary joint thereof to the frame, and the first pivot arm is pivotally connected at the pivot joint thereof to the first link at the second end thereof, and
a first cam follower disposed at the cam joint of the first pivot arm, the first cam follower movable within the track of the first tilt plate during operable rotation of the first pivot arm in a first direction to induce a rotary displacement of the first tilt plate; and
a second mechanism associated with the second tilt plate, the second mechanism comprising:
a second link having a first end and a second end, the second link pivotally connected at the first end thereof to the pivot member at the upper end thereof,
a second pivot arm having a pivot joint, a cam joint, and a rotary joint located on the second side of the reference plane and defining an axis of rotation,
wherein the second pivot arm is rotatably connected at the rotary joint thereof to the frame, and the second pivot arm is pivotally connected at the pivot joint thereof to the second link at the second end thereof, and a second cam follower disposed at the cam joint of the second pivot arm, the second cam follower movable within the track of the second tilt plate during operable rotation of the second pivot arm in a second direction opposite the first direction to induce a rotary displacement of the second tilt plate.

2. The assembly of claim 1, wherein the frame further includes:
a pair of first and second opposing, spaced-apart base plates;
wherein the pair of tilt plates is disposed intermediate the pair of base plates and rotatably connected to the pair of base plates;
wherein the pivot member is rotatably connected to the frame at the pair of first and second base plates; and
wherein the first pivot arm of the first mechanism is rotatably connected at the rotary joint thereof to the first base plate, and the second pivot arm of the second mechanism is rotatably connected at the rotary joint thereof to the second base plate.

3. The assembly of claim 2, further includes:
a rotary shaft configured to connect the pair of base plates;
wherein the pair of tilt plates is rotatably supported by the rotary shaft.

4. The assembly of claim 1, further includes:
a connection member configured to connect the first tilt plate and the second tilt plate to enable tandem rotation thereof.

5. The assembly of claim 1, wherein the pivot member further includes:
a pivot bar having an upper end and a lower end; and
a pivot rod extending longitudinally from the pivot bar at the lower end thereof.

6. The assembly of claim 1, further includes:
a detent mechanism configured in a cooperative relationship with the pivot member to releasably maintain the pivot member in a centered orientation.

7. The assembly of claim 1, wherein the first mechanism and the second mechanism have generally mirror-image designs across the reference plane.

8. The assembly of claim 1, wherein:
the track formed in the first tilt plate being suitably configured to enable the first cam follower of the first mechanism to travel therethrough during rotation of the first pivot arm in the first direction; and
the track formed in the second tilt plate being suitably configured to enable the second cam follower of the second mechanism to travel therethrough during rotation of the second pivot arm in the second direction.

9. The assembly of claim 8, wherein:
the first cam follower includes a roller device; and
the second cam follower includes a roller device.

10. The assembly of claim 1, wherein:
the first mechanism and the track formed in the first tilt plate having a cooperative relationship such that a possible rotational influence exerted on the first tilt plate induces an exertion on the first pivot arm via the first cam follower that is generally directed towards the axis of rotation of the first pivot arm along a dimension extending between the cam joint and the rotary joint thereof; and
the second mechanism and the track formed in the second tilt plate having a cooperative relationship such that a possible rotational influence exerted on the second tilt plate induces an exertion on the second pivot arm via the second cam follower that is generally directed towards the axis of rotation of the second pivot arm along a dimension extending between the cam joint and the rotary joint thereof.

11. The assembly of claim 1, wherein the pivot member having an axis of rotation spaced-apart from the common axis of rotation of the pair of tilt plates to define a dimensional direction therebetween that forms a central axis lying in the reference plane.

12. The assembly of claim 1, wherein:
the first pivot arm comprises a configuration including a first section extending between the rotary joint and the cam joint thereof, a second section extending between the rotary joint and the pivot joint thereof, and a third section extending between the pivot joint and the cam joint thereof; and
the second pivot arm comprises a configuration including a first section extending between the rotary joint and the cam joint thereof, a second section extending between the rotary joint and the pivot joint thereof, and a third section extending between the pivot joint and the cam joint thereof.

13. An assembly for use with a tilt tray, comprising:
a frame having a pair of first and second opposing, spaced-apart base plates;
a pair of first and second opposing, spaced-apart tilt plates disposed intermediate the pair of base plates and rotatably connected to the frame at the pair of base plates to define a common axis of rotation, each tilt plate having a track formed therein, a reference plane passing through the common axis of rotation and having a first side and a second side;
wherein the first and second tilt plates operatively support the tilt tray;
a pivot member rotatably connected to the frame at the pair of first and second base plates, the pivot member having an upper end and a lower end;
a first mechanism associated with the first tilt plate, the first mechanism comprising:
a first link having a first end and a second end, the first link pivotally connected at the first end thereof to the pivot member at the upper end thereof,
a first pivot arm having a pivot joint, a cam joint, and a rotary joint located on the first side of the reference plane and defining an axis of rotation,
wherein the first pivot arm is rotatably connected at the rotary joint thereof to the first base plate, and the first pivot arm is pivotally connected at the pivot joint thereof to the first link at the second end thereof, and
a first cam follower disposed at the cam joint of the first pivot arm, the first cam follower movable within the track of the first tilt plate during operable rotation of the first pivot arm in a first direction to induce a rotary displacement of the first tilt plate; and
a second mechanism associated with the second tilt plate, the second mechanism comprising:
a second link having a first end and a second end, the second link pivotally connected at the first end thereof to the pivot member at the upper end thereof,
a second pivot arm having a pivot joint, a cam joint, and a rotary joint located on the second side of the reference plane and defining an axis of rotation,
wherein the second pivot arm is rotatably connected at the rotary joint thereof to the second base plate, and the second pivot arm is pivotally connected at the pivot joint thereof to the second link at the second end thereof, and
a second cam follower disposed at the cam joint of the second pivot arm, the second cam follower movable within the track of the second tilt plate during operable rotation of the second pivot arm in a second direction opposite the first direction to induce a rotary displacement of the second tilt plate.

14. The assembly of claim 13, further includes:
a detent mechanism configured to releasably maintain the pivot member in a centered orientation.

15. The assembly of claim 13, wherein the first mechanism and the second mechanism have generally mirror-image designs across the reference plane.

16. The assembly of claim 13, further includes:
a connection member configured to connect the pair of tilt plates to enable tandem rotation thereof.

17. The assembly of claim 13, wherein the pivot member having an axis of rotation spaced-apart from the common axis of rotation of the pair of tilt plates to define a dimensional direction therebetween that forms a central axis lying in the reference plane.

18. An assembly for use with a tilt tray, comprising:
a frame having a pair of first and second opposing, spaced-apart base plates;
a rotary shaft configured to connect the pair of base plates;
a pair of first and second opposing, spaced-apart tilt plates rotatably supported by the rotary shaft to define a common axis of rotation, each tilt plate having a track formed therein, a generally vertical reference plane passing through the common axis of rotation and having a first side and a second side;
wherein the first and second tilt plates operatively support the tilt tray;
a connection member configured to connect the pair of tilt plates to enable tandem rotation thereof;
a pivot member rotatably connected to the frame at the pair of first and second base plates, the pivot member having an upper end and a lower end;
a detent mechanism configured to releasably maintain the pivot member in a centered orientation;
a first mechanism associated with the first tilt plate, the first mechanism comprising:
a first link having a first end and a second end, the first link pivotally connected at the first end thereof to the pivot member at the upper end thereof,
a first pivot arm having a pivot joint, a cam joint, and a rotary joint located on the first side of the vertical reference plane and defining an axis of rotation,
wherein the first pivot arm is rotatably connected at the rotary joint thereof to the first base plate, and the first pivot arm is pivotally connected at the pivot joint thereof to the first link at the second end thereof, and
a first cam follower disposed at the cam joint of the first pivot arm, the first cam follower movable within the track of the first tilt plate during operable rotation of the first pivot arm in a first direction to induce a rotary displacement of the first tilt plate; and
a second mechanism associated with the second tilt plate, the second mechanism comprising:
a second link having a first end and a second end, the second link pivotally connected at the first end thereof to the pivot member at the upper end thereof,
a second pivot arm having a pivot joint, a cam joint, and a rotary joint located on the second side of the vertical reference plane and defining an axis of rotation,
wherein the second pivot arm is rotatably connected at the rotary joint thereof to the second base plate, and the second pivot arm is pivotally connected at the pivot joint thereof to the second link at the second end thereof, and
a second cam follower disposed at the cam joint of the second pivot arm, the second cam follower movable within the track of the second tilt plate during operable rotation of the second pivot arm in a second direction opposite the first direction to induce a rotary displacement of the second tilt plate.

19. The assembly as recited in claim 18, wherein:
the first pivot arm comprises a configuration including a first section extending between the rotary joint and the cam joint thereof, a second section extending between the rotary joint and the pivot joint thereof, and a third section extending between the pivot joint and the cam joint thereof; and
the second pivot arm comprises a configuration including a first section extending between the rotary joint and the cam joint thereof, a second section extending between the rotary joint and the pivot joint thereof, and a third section extending between the pivot joint and the cam joint thereof.

20. The assembly of claim 18, wherein the pivot member having an axis of rotation spaced-apart from the common axis of rotation of the pair of tilt plates to define a dimensional direction therebetween that forms a central axis lying in the vertical reference plane.

* * * * *